United States Patent
Winand et al.

(10) Patent No.: US 9,775,131 B2
(45) Date of Patent: Sep. 26, 2017

(54) ENERGY RESOURCE SYSTEM

(71) Applicant: INTELLIGENT ENERGY LIMITED, Loughborough, Leicestershire (GB)

(72) Inventors: Henri M. A. Winand, Loughborough (GB); John Joseph Murray, Loughborough (GB); Christopher William Bishop, Loughborough (GB); Amarpal Singh Samra, Loughborough (GB); Daniel Ninan, Loughborough (GB); Prajwal Nirwan, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 14/807,746

(22) Filed: Jul. 23, 2015

(65) Prior Publication Data
US 2016/0029342 A1    Jan. 28, 2016

(30) Foreign Application Priority Data
Jul. 24, 2014 (GB) .................................. 1413163.5

(51) Int. Cl.
| | |
|---|---|
| H04B 1/38 | (2015.01) |
| H04W 68/00 | (2009.01) |
| G06Q 10/10 | (2012.01) |
| G01S 5/02 | (2010.01) |
| H02J 3/38 | (2006.01) |
| H04W 4/02 | (2009.01) |
| H04W 64/00 | (2009.01) |

(52) U.S. Cl.
CPC ......... *H04W 68/005* (2013.01); *G01S 5/0284* (2013.01); *G06Q 10/10* (2013.01);
(Continued)

(58) Field of Classification Search
CPC .................................................. H04W 68/005
(Continued)

(56) References Cited

U.S. PATENT DOCUMENTS

| | | | |
|---|---|---|---|
| 9,088,168 B2* | 7/2015 | Mach | H02J 5/005 |
| 2003/0137277 A1* | 7/2003 | Mori | G01R 31/3648 |
| | | | 320/132 |

(Continued)

FOREIGN PATENT DOCUMENTS

| | | |
|---|---|---|
| EP | 2 447 107 A2 | 5/2012 |
| EP | 2698975 A1 | 2/2014 |

(Continued)

OTHER PUBLICATIONS

GB Search Report mailed Jun. 22, 2015 in GB Application No. 1413163.5.
(Continued)

*Primary Examiner* — Sanh Phu
(74) *Attorney, Agent, or Firm* — Baker & Hostetler LLP (57) ABSTRACT

An energy resource management server comprising: means for receiving energy availability messages from remote energy resources and geographic location indicators indicative of the geographical location of said remote energy resources; means for receiving energy request messages from remote energy resources and geographic location indicators indicative of the geographical location of said remote energy resources; a processor configured to determine counterparties in an energy resource transfer based on received energy availability messages and received energy request messages and the geographical location of the remote energy resources, and to transmit, to one or both of the counterparties, location information of the other counterparty of the determined counterparties.

18 Claims, 2 Drawing Sheets

(52) U.S. Cl.
CPC ............. *H02J 3/387* (2013.01); *H04W 4/023* (2013.01); *H04W 64/003* (2013.01)

(58) Field of Classification Search
USPC ........................................................ 455/573
See application file for complete search history.

(56) References Cited

U.S. PATENT DOCUMENTS

| | | |
|---|---|---|
| 2011/0130885 A1 | 6/2011 | Bowen et al. |
| 2013/0035823 A1 | 2/2013 | Yoshida |
| 2013/0179057 A1 | 7/2013 | Fisher et al. |
| 2015/0123607 A1* | 5/2015 | Fujita .................... H02J 7/0013 320/108 |

FOREIGN PATENT DOCUMENTS

| | | |
|---|---|---|
| EP | 2753000 A2 | 7/2014 |
| EP | 2 792 538 A2 | 10/2014 |
| WO | WO 2009/052450 A2 | 4/2009 |
| WO | 2014/010295 A1 | 1/2014 |

OTHER PUBLICATIONS

Great Britain Patent Application No. 1413163.5; Section 17(5)(b) Examination Opinion; dated Jan. 27, 2015; 6 pages.
International Patent Application No. PCT/GB2015/052101; Int'l Search Report and the Written Opinion; dated Sep. 18, 2015; 10 pages.

\* cited by examiner

ENERGY RESOURCE SYSTEM

CROSS-REFERENCE TO RELATED APPLICATIONS

This application claims priority to Application GB 1413163.5, filed Jul. 24, 2014 in the United Kingdom Intellectual Property Office, the entirety of the application is hereby incorporated by this reference as if fully set forth herein.

BACKGROUND OF THE INVENTION

Field of the Invention

This disclosure relates to an energy resource system for charging portable mobile telecommunication devices. In particular, it relates to an energy resource management server for determining counterparties for an energy resource transfer between a first party wanting energy and at least one party having an energy resource available for providing said energy. The disclosure also relates to a mobile telecommunications device for transmitting a message to request an energy resource transfer and to transmit a message to offer use of an energy resource.

Description of the Related Art

Portable or mobile telecommunication devices typically use an energy resource to provide electrical power for the device when it is away from a mains electricity point. The energy resource may comprise a battery, which can be charged with energy. The battery may comprise a primary battery (built-in or removable) of the mobile telecommunication device or may comprise a secondary battery for charging the primary battery. Thus, the mobile telecommunication device may have a primary battery therein and a user of the mobile telecommunication device may have an energy resource comprising a secondary battery which can be removably connected to the primary battery for charging it. Further, the energy resource may comprise an energy generation device, such as a fuel cell, which can generate energy from a source of fuel for supplying energy to a mobile telecommunication device directly or for charging a primary battery of said mobile telecommunication device.

The energy demand of portable mobile telecommunication devices is increasing and the primary battery of said portable mobile telecommunication device may be depleted of energy long before the user intends to return to a mains electricity point to recharge the device. The availability of mains electricity points may be limited in certain areas such as public buildings or the countryside.

SUMMARY OF THE INVENTION

According to a first aspect we provide an energy resource management server comprising:
  means for receiving energy availability messages from remote energy resources and geographic location indicators indicative of the geographical location of said remote energy resources;
  means for receiving energy request messages from remote energy resources and geographic location indicators indicative of the geographical location of said remote energy resources;
  a processor configured to determine counterparties in an energy resource transfer based on received energy availability messages and received energy request messages and the geographical location of the remote energy resources, and to transmit, to one or both of the counterparties, location information of the other counterparty of the determined counterparties.

This is advantageous as the energy resource management server is able to determine counterparties based on criteria and then inform a party requiring energy of a counterparty who is willing to provide them with energy. The server thus provides part of a portable energy resource sharing system. It will be appreciated that the server may comprise a central server or its function may be distributed over several servers or its function may be distributed over the remote energy resources or a combination of the above.

Optionally, the processor is configured to determine counterparties to an energy resource transfer based on one or more of: energy resource type, energy resource level, energy availability quantum, required energy transfer quantum, transfer time, energy availability time window, geographical proximity, price or value of the available energy (or discrete amounts of energy). The energy resource type may comprise a battery or a fuel cell or a sub-type of a battery or fuel cell. The energy resource level may comprise an amount of energy available in the energy resource. The energy availability quantum may comprise an amount of energy available for sharing from one counterparty. The required energy transfer quantum may comprise an amount of energy requested or required by the other counterparty. The energy availability time window may comprise the time each counterparty is available for sharing. The effective determination of counterparties is advantageous.

Optionally, the processor is configured to, prior to the transmittal of location information of a first counterparty to the second counterparty, transmit an energy transfer connection notification message to inform the first counterparty of the identification of a counterparty requesting energy resource. This is advantageous as the counterparty is informed if their location is disclosed to the other counterparty. If the server is configured to direct the energy sharing counterparty to the energy requesting counterparty, by the disclosure of location information, then the energy transfer connection notification message may be sent to the counterparty requesting the energy resource.

Optionally, the processor is configured to await the receipt of a response from the counterparty sent the energy transfer connection notification message before transmitting the location information to the other counterparty. Thus, the energy sharer or requestor can approve the sharing of their location.

Optionally, the processor is configured to transmit a list of candidate counterparties having energy availability to the counterparty requesting energy resource, each candidate in the list associated with an approximate location indicator and, after receipt of a selection message which indicates a selected candidate from the list of candidate counterparties, transmit a more precise location indicator for the selected candidate counterparty.

Optionally, the server includes means to receive energy transfer messages indicative of the amount of energy transferred between the counterparties. The energy transfer messages may be received periodically throughout the energy resource transfer or at the end of the transfer. This may enable a reward system to be implemented or future energy resource transfers may be controlled based on this information.

Optionally, the processor is configured to transmit at least one energy transfer control messages to one or both of the counterparties to control the transfer of energy between the counterparties. Thus, the server may control the flow of energy between the counterparties. The energy transfer control message may comprise one or more of; begin energy transfer, end energy transfer. Thus, the server may control the amount of fuel drawn from a first counterparty's fuel storage vessel by a fuel cell of the other counterparty.

Optionally the processor is configured to associate a record of the amount of energy transferred with a counterparty identifier which identifies at least one of the counterparties.

Optionally, the server comprises;
  means to receive geographical location indicator messages comprising the geographical location of the remote energy resource supplying energy in the energy resource transfer; and
  means to receive energy resource owner location messages comprising the geographical location of the owner of the energy resource that is supplying energy in the energy resource transfer,
  the processor configured to provide for determination of the geographical distance, during the energy resource transfer, between the remote energy resource supplying energy to one of the counterparties and the other counterparty comprising the owner of said remote energy resource.

This is advantageous to ensure the security of shared energy resources as the distance between the various devices may be monitored to ensure the devices do not stray too far apart.

Optionally, the processor is configured to determine counterparties to an energy resource transfer based on energy availability quantum, wherein energy availability quantum one or more of;
  i) a measure of the amount of energy available for transfer;
  ii) a measure of the time required to transfer a particular amount of energy between remote energy resources.

Optionally, the remote energy resources include portable fuel cell power sources having associated fuel reservoirs. Thus, the resources shared may comprise the fuel cell power source and fuel reservoir or solely the fuel reservoir.

Optionally, the remote energy resources include batteries.

The server may be configured to receive an energy value message from the remote energy resources specifying a value of the energy an energy resource is willing to share. The server may be configured to receive an energy bid message from the remote energy resources specifying a value an energy resource is willing to pay for energy. The server may be configured to provide for the determination of the counterparties based on the energy value messages and the energy bid messages. This is advantageous as the users requiring energy may make one or more bids for energy supplied by users willing to share energy. The users willing to share energy may set a reserve value by way of the energy value message or a fixed price they want for their energy. Accordingly, the server may conduct an auction to determine the counterparties of the energy resource transfer. The auction may be configured to maximise the price paid for the energy.

The server may be configured to receive auction specification messages from energy resources specifying one or more of a geographic location where they are willing to be entered into an auction for the energy in their energy resource, a time of day availability, whether they are prepared to come to the user requesting the energy or would the user requesting the energy need to go to them.

The server may be configured to transmit or record a transaction record message which may specify the collection of a transaction fee for brokering the energy resource transfer and/or the collection of payment between counterparties for the energy transferred.

The server may be configured to determine counterparties based on one or more of geographical location, willingness to share energy at particular times, willingness to come to the person in need of energy, the geographical location of the counterparties, the journey time between the counterparties, a measure of the reliability of the energy resource or a credit score of the energy sharer and the energy requester.

According to a second aspect we provide a mobile telecommunication device comprising:
  a first communication channel configured for coupling to an energy resource;
  a second communication channel configured for coupling to a remote server;
  a processor configured to receive a status message from the energy resource via the first communication channel and to transmit an energy availability message and a geographic location indicator to the remote server via the second communication channel, the processor further configured to receive an energy request message from the remote server, and to provide for display of said energy request.

This is advantageous as the mobile telecommunications device or software installed thereon is configured to provide for energy sharing including communication with an associated energy resource and a server for determining counterparties to an energy resource transfer.

Optionally, the status message includes an indication of one or more of: an energy resource type; an energy resource level. Thus, the mobile telecommunications device can automatically receive information from the resource to pass to the server for determining counterparties.

Optionally, the energy availability message includes an indication of one or more of: an energy resource type; an energy resource level; an energy availability quantum; a transfer time; an energy availability time window.

Optionally, the device is configured to receive a user input defining an energy availability quantum and an energy availability time window.

Optionally, the mobile telecommunication device is incorporated within a cellular telephone or within the energy resource unit. Thus, an energy resource such as a fuel cell energy source may include means for telecommunication with the server.

Optionally, the mobile telecommunication device further includes an energy resource unit, the energy resource unit comprising: a fuel cell power source and a fuel storage vessel; or a fuel reservoir.

Optionally, the processor is configured to display guidance to the geographical location of at least one of the energy resources willing to share energy. Thus, the user may be guided to the resource offering energy for sharing.

Optionally, the processor is configured to control the energy resource transfer based on at least one of the amount of energy specified in the energy request message, an amount of energy specified in a message received from the remote server, at least one control signal received from the remote server or at least one control signal received from another mobile telecommunications device.

According to a third aspect we provide a computer program or computer program product comprising instructions for execution by a processor to;
  receive energy availability messages from remote energy resources and geographic location indicators indicative of the geographical location of said remote energy resources;

receive energy request messages from remote energy resources and geographic location indicators indicative of the geographical location of said remote energy resources;

determine counterparties in an energy resource transfer based on received energy availability messages and received energy request messages and the geographical location of the remote energy resources, and to transmit, to one or both of the counterparties, location information of the other counterparty of the determined counterparties.

According to a fourth aspect we provide a computer program or computer program product comprising instructions for execution by a processor to;

establish a first communication channel for coupling to an energy resource;

establish a second communication channel for coupling to a remote server;

receive a status message from the energy resource via the first communication channel and to provide for the transmission of an energy availability message and a geographic location indicator to the remote server via the second communication channel, and to receive an energy request message from the remote server, and to provide for display of said energy request.

According to a fifth aspect we provide an energy sharing system configured to;

determine a user associated with an energy resource involved in energy sharing;

associate a reward with said user.

The energy sharing counterparties may be determined by the server of the first aspect. The energy resources may comprise portable fuel cell chargers. Optionally said reward may be based on the amount of energy shared with another user by said user. Optionally said reward may be based on an amount of time said user is available for energy sharing. Said reward may comprise a monetary award or a chance to win a monetary award. The system may be configured to provide the reward to the user, such as by way of credit/debit card transaction, iTunes based transaction, PayPal based transaction or Bitcoins transaction or any other monetary transfer transaction.

BRIEF DESCRIPTION OF THE DRAWINGS

There now follows, by way of example only, a detailed description of embodiments of the disclosure with reference to the following figures, in which.

DETAILED DESCRIPTION OF THE INVENTION

Figure 1:
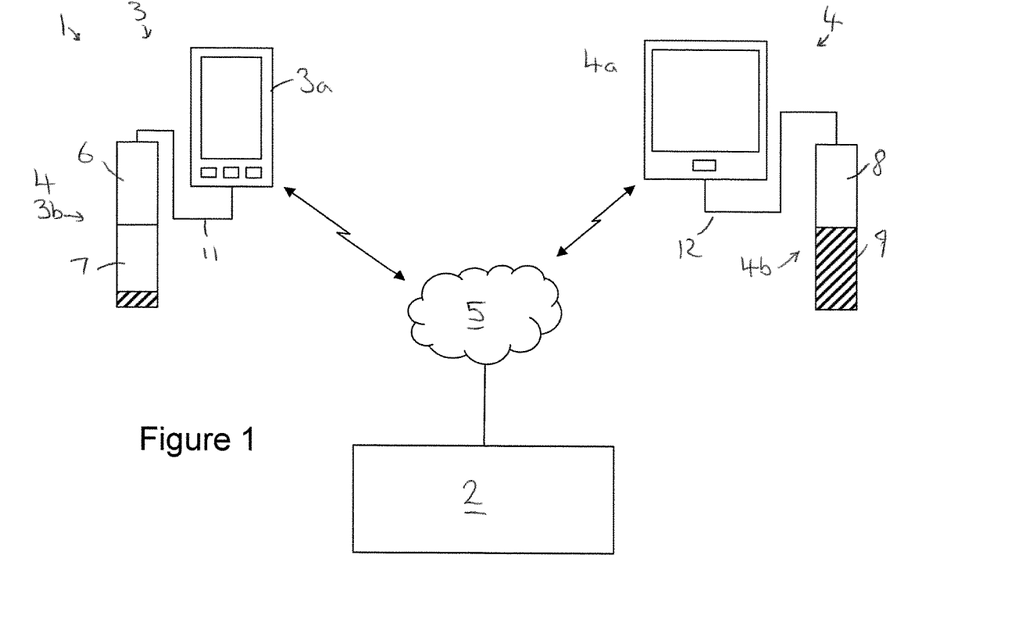
FIG. 1 shows an energy resource management server and two portable energy resources.

FIG. 1 shows energy resource system 1 comprising an energy management resource management server 2 and a first remote energy resource 3 and a second remote energy resource 4. The first and second remote energy resources 3, 4 each have means to communicate with the server 2, wherein said communication may be via a network such as the internet 5. The remote energy resources are remote from the server and comprise portable resources of energy.

The remote energy resources 3 and 4 may have communication circuitry to effect the communication with the server 2, such as GSM, EDGE, UMTS or other cellular telephone standard, Wi-fi, Bluetooth or other wireless communication standard. While wireless communication would be more typical for portable mobile telecommunication devices, wired communication circuitry may be utilised.

The first remote energy resource 3, more specifically comprises a mobile telecommunications device 3a, which comprises a mobile telephone, and a fuel cell charger 3b. The fuel cell charger comprises a fuel cell 6 and a fuel storage vessel 7. The fuel cell may comprise an electrochemical fuel cell that receives fuel, such as hydrogen, from the fuel storage vessel 7 and generates electricity therefrom.

The second remote energy resource 4, more specifically comprises a mobile telecommunications device 4a, which comprises a tablet computer, and a fuel cell charger 4b. Likewise, the fuel cell charger 4b comprises a fuel cell 8 and a fuel storage vessel 9. The fuel cell may comprise an electrochemical fuel cell that receives fuel, such as hydrogen, from the fuel storage vessel 9 and generates electricity therefrom.

In general, the energy resources may comprise two connectable parts; a mobile telecommunication device which consumes energy and may provide for communication with the server and an energy generation or storage device. The energy generation device may generate energy from a fuel or other energy source. The energy storage device may comprise a battery separate from the primary battery of the mobile telecommunication device. A user may primarily use the energy generation or storage device for charging the primary battery of their own mobile telecommunication device but the system 1 gives the user the ability to offer use of his/her energy generation/storage device to others and to use the energy generation/storage device of other users.

The mobile telephone 3a and tablet computer 4a each have a primary battery built into the respective device forming the primary power source for the device 3a, 4a in normal use. The fuel cell chargers 3b and 4b comprise peripheral devices that can be used to charge the primary battery of each device respectively, when required. The mobile telecommunication devices 3a, 4a and/or the chargers 3b and/or 4b may include geographic location determination circuitry, such as Global Positioning System, other satellite based location service or ground-based geographic location determination system or a hybrid thereof. Alternatively, they may not include such circuitry but the server 2 may be able to determine their geographical location (even if approximately) from the route the communication channel between the device 3 or 4 takes to the server 2 or from a MAC address database, as will be known to those skilled in the art.

The fuel cell chargers 3b, 4b are shown connected to their respective mobile telecommunication device 3a, 3b via a cable 11, 12. The cables 11 and 12 provide a communication channel for communication between the device 3a and the charger 3b and the device 4a and the charger 4b. The cable 11, 12 also provides for transfer of energy between the charger 3b and 4b and the respective device 3a and 4a. It will be appreciated that the cable may be used for only one of the communication and energy transfer functions and the other function may be achieved wirelessly or both functions may be achieved wirelessly. For example, Bluetooth®, WiFi or other wide area or local area or personal area communication standard may be used to effect communication. Further, energy transfer may be achieved by inductive methods, which will be known to those skilled in the art.

Thus, in this embodiment, a combination of the mobile telecommunication device 3a or 4a and the respective fuel cell charger 3b or 4b each form a mobile energy resource, which can communicate with the remote energy resource management server 2. In particular, software stored on the mobile telecommunication device 3a or 4a, which may be in the form of an "app", contains instructions to use the hardware/software of the mobile telecommunications device 3a or 4a to communicate with the fuel cell charger 3b or 4b respectively via a first communication channel and communicate with the server 2 via a second communication channel.

In other embodiments, the fuel cell charger 3b or 4b (or other type of energy resource) may include communication circuitry to communicate directly with the server 2 rather than utilising the communication circuitry of the mobile telecommunication device 3a or 4a. The fuel cell charger 3b or 4b may include a display and an input device to provide for interaction with a user.

The energy resource management server 2 may comprise a server connected to the internet with which the remote energy resources 3, 4 communicate via a cellular network. In other embodiments, the server 2 may comprise a local device provided to cover a local area, such as a station or city, and the remote energy resources 3, 4 may communicate with the server directly through Wi-Fi or the like. In other embodiments, the function of the server may be distributed over the remote energy resources 3, 4.

The energy resource management server 2 has means for receiving messages comprising software, hardware or firmware configured to process messages received from the remote energy resources 3, 4 and provide them to a processor. The server 2 is configured to receive energy availability messages including geographic location indicators from remote energy resources 3, 4. The energy availability messages comprise declarations by the remote energy resources 3, 4 or a user thereof that they are willing to provide or share energy from the energy resource (such as fuel cell charger 3b, 4b) with another energy resource 3, 4 or mobile telecommunication device 3a, 4a. The energy availability message may include information of the amount of energy available for sharing or the time available for energy transfer. The energy availability message, in this embodiment, includes geographic location information determined by the energy resource 3, 4. However, the geographical location information could be determined by the server. The energy availability message also provides identification information of the energy resource 3, 4 offering its energy.

The server 2 is further configured to receive energy request messages. The energy request messages comprise requests from energy resources 3, 4 or mobile telecommunication devices 3a, 4a that wish to receive energy from another energy resource 3, 4. The energy request message may include information of the amount of energy required or desired or the time available for energy transfer or other criteria. The energy request message, in this embodiment, includes geographic location information determined by the energy resource 3, 4 sending the energy request message. However, the geographical location information could be determined by the server. The energy request message also provides identification information of the energy resource 3, 4 requesting energy.

The server includes a processor configured to determine counterparties for participation in an energy resource transfer from the energy resource of one party to the energy resource of another party. The party wanting energy will be referred to as the "party requesting energy" and the party willing to provide energy to others will be referred to as the "energy sharing party". The processor may determine the counterparties of said transfer based on received energy availability messages and received energy request messages. Thus, the counterparties may be determined based on a correlation between an amount of energy desired by one party and the amount of energy offered by the other party. Alternatively, the geographic distance between the parties may be used to determine counterparties. Other examples of how the processor may determine the counterparties are given below.

The processor is further configured to transmit to the mobile telecommunications device of the counterparty requiring energy, geographical location information of a counterparty indicating energy availability. The counterparty requiring energy can then physically locate the counterparty offering energy and connect their energy resource or mobile telecommunication device to the energy resource of the energy sharing party to receive energy therefrom.

Figure 2:
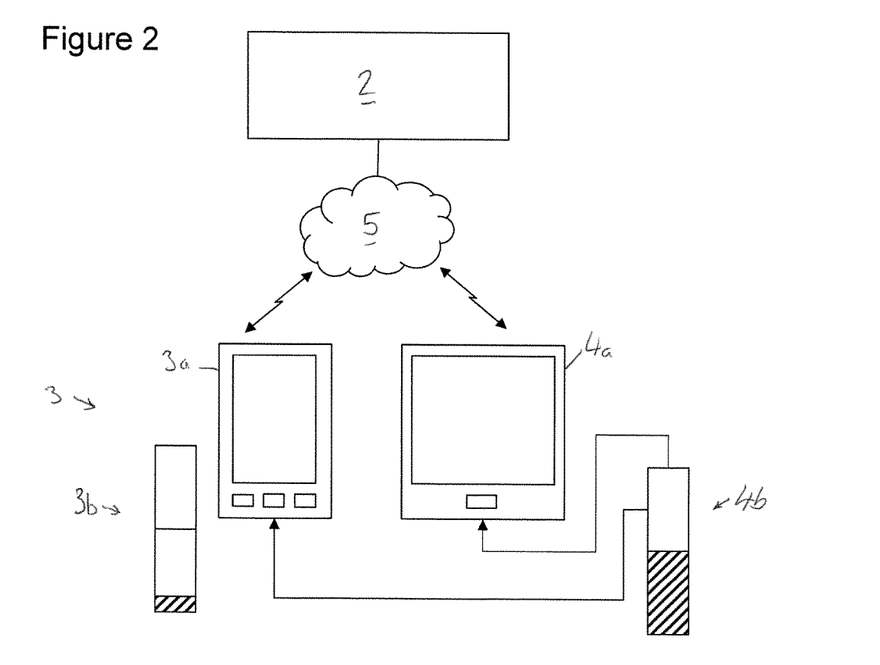
FIG. 2 shows the entities of FIG. 1 during an energy resource transfer.

FIG. 2 shows the mobile telecommunication device 3a of a first party receiving energy in an energy resource transfer from the energy generation/storage device (charger 4b) of a second party. The energy resource transfer may be controlled by the server 2 or by the mobile telecommunication devices 3a, 4a or by the energy generation/storage devices 3b, 4b or a combination thereof.

The server 2 may be configured to receive one or more energy transfer messages stating the amount of energy transferred between the counterparties. These messages may be used by the server 2 to control the energy transfer or a record of the energy transferred may be recorded for determining conditions of future energy transfers in which either of the parties may participate (whether with each other or with further parties).

Figure 3:
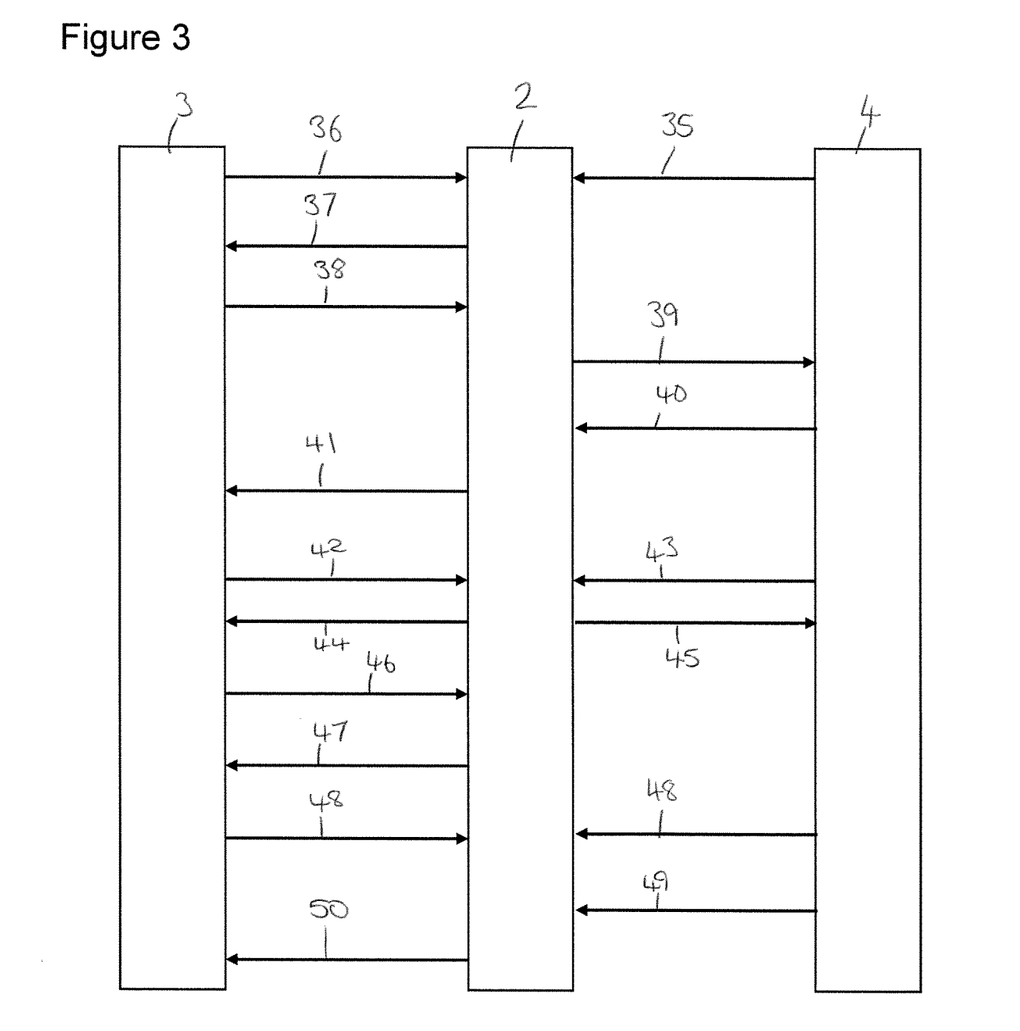
FIG. 3 shows a message exchange between two different remote energy resources and an energy management server.

Further details and features of an embodiment will be described wherein FIG. 3 shows an example exchange of messages between the first energy resource 3 and the server 2 and the second energy resource 4 and the server 2.

The energy resources may be of the form described above in relation to FIGS. 1 and 2, although it will be appreciated that the features of this disclosure may apply to any energy resource having the capability to communicate with the server 2 and to share energy stored in or generated thereby. A mobile telecommunication device comprising a mobile telecommunications device in combination with a peripheral energy generation device, such as a fuel cell charger, forms an example of such an arrangement. The description below will refer to such an example but it will be appreciated that the principles can apply to other arrangements.

In the following description the second energy resource 4 will comprise an energy sharing party and the first energy resource 3 will comprise a party requiring energy.

The server 2 receives, from the energy resource 4 an energy availability message 35 indicating that the energy resource 4 has energy which it can share with other parties. The energy availability message may be generated automatically by the energy resource 4 when energy or a fuel for the fuel cell is available or above a threshold amount. The user or owner of the energy resource may set the threshold amount or provide permission for the resource 4 to inform the server 2 of the availability of energy for sharing by way of the energy availability message. In a further example, the user may be required to use an app on their mobile telecommunication device 4a or fuel cell charger 4b to specify their willingness to share energy with others and/or specify any conditions of said sharing. For example, the user or resource may determine a proportion of the available energy in the resource designated for sharing. The user may define a time period or time window in which they are willing to share energy, such as while they are waiting in an airport before boarding their flight. These conditions may form part of the energy availability message 35.

The energy availability message 35 may also include geographical location information identifying the physical location of the energy resource 4. The geographical location may be determined by the mobile telecommunication device 4a. The message 35 may include criteria comprising of the type of energy resource, for example, a secondary battery type or a fuel cell charger type. The message 35 may include criteria comprising energy resource technical specifications, such as a connector type for transferring energy or an energy transfer method such as by wire or inductive charging for that particular resource. The message may further include a unique identifier of the resource 4. The server may be able to derive some or all of the specifications of the resource, such as the type of device, from the unique identifier with reference to an energy resource database. The criteria may be used by the server 2 to determine counterparties of an energy resource transfer.

On receipt of the message 35 the server 2 may store the information contained in the message 35, temporarily or permanently. The server 2 may create an energy sharer record in an energy sharer database using the information in the message. It will be appreciated that typically the server 2 will receive a plurality of energy availability messages 35 each from a different remote energy resource and create a record for each in the energy sharer database.

The server 2 also receives an energy request message 36 from a remote energy resource 3 indicating that a remote energy resource 3 is in need of energy. It will be appreciated that the remote energy resource sending the energy request message may not have any energy to share themselves. For example, the remote energy resource requesting energy may have used all of the fuel in its fuel cell charger 3b and is therefore looking to find an alternative portable energy resource to use. Alternatively, the remote energy resource requesting energy may solely comprise a mobile telecommunication device 3a.

The server 2 also receives the geographical location of the remote energy resource that sent the energy request message 36. The geographical location may be determined by the resource 3 and form part of the energy request message 36 or the geographical location may be determined by the server 2.

The energy request message 36 may also include details of the amount of energy required or a "required energy transfer quantum". This may be expressed as an amount of charge, a battery percentage amount, a time period for which the resource 3 is available for receiving energy. The resource 3, such as an app on the mobile telecommunication device, may translate each of these quanta into a standard format for use by the server 2, or the server may perform the translation. It will be appreciated that additional information may be required to perform the translation. For example, the capacity of the primary battery of the mobile telecommunication device may be required to determine the amount of charge/energy is required to reach a desired primary battery percentage. The energy request message 36 may also include details of the current energy resource level, such as a primary battery level, or energy generation/storage device level. The message 36 may include details of the type of energy resource, for example, a primary battery type or a fuel cell charger type. The message 36 may include details such as a connector type for transferring energy or an energy transfer method such as by wire or inductive charging for that particular resource. The message may further include a unique identifier of the resource 3 requiring energy. The server may be able to derive some or all of the specifications of the resource, such as the type of device, from a unique identifier with reference to an energy resource database.

The server 2, on receipt of the energy request message 36, may determine a counterparty that is willing to share their energy resource. Thus, the server 2 may reference the records of the energy sharer database to identify a counterparty for an energy resource transfer or several candidate counterparties. The determination of a counterparty may be determined based on the geographical location of the party requesting energy and the energy sharing party. Thus, the server 2 or processor thereof may determine an energy sharing resource 4 that is willing to share energy that is closest to the geographical location of the resource requesting energy 3.

The server 2 may utilise other or additional criteria to determine the counterparties to an energy resource transfer. For example, the server 2 may consider the amount of energy requested by the resource 2 (the "required energy transfer quantum") compared to the amount of energy a resource 4 is willing to share or has available (the "energy availability quantum"). As mentioned above, these quanta could by defined in various ways such as time available for energy transfer or primary battery percentage required. The server may be required to manipulate these quanta to determine counterparties. For example, the energy requester 3 may request enough energy to obtain a charge of 70% of the primary battery of their mobile telecommunication device. The energy sharer may specify that they are available for a time period of 15 minutes for an energy transfer. Thus, the server 2, using the energy request message 36 may determine the current primary battery level of the resource 3 and thereby calculate the amount of charge required. The server 2 may also determine the potential charge rate achievable by the resource 2 and therefore the approximate time it would take to achieve the charge of 70% requested. The potential charge rate may be determined from a resource unique identifier and with reference to predetermined database of unique identifiers, mobile telecommunication device types and charge rates. The server 2 can then perform a matching routine to identify resources willing to share for a sufficient period of time to satisfy the energy demand of the resource 3 requesting energy.

The server 2 may take account of one or more criteria of the resource 3 requesting energy and the resource 4 willing to share energy when determining counterparties to an energy resource transfer. The criteria may include one or more of energy resource type (fuel cell charger, secondary battery etc), energy resource level (the level of energy present in a resource), energy availability quantum (an amount of electrical energy, a time period, a fuel level or amount of fuel available for use, a predicted battery percentage charge amount that is available for transfer), required energy transfer quantum (an amount of energy, a time period or a primary battery percentage that is requested), a transfer time (a time the counterparty is willing to share their energy), energy availability time window (a temporal window where it is convenient for one of the counterparties to be available for sharing energy), geographical proximity (the physical distance or predicted travel time between the counterparties).

In this example, the server 2 is configured to send a candidate message 37 comprising a list of candidate counterparties having energy availability. In other examples, the resource 3 is not offered a choice of candidate counterparties. Each candidate energy resource may have matched some or all of the matching criteria used by the server 2. The candidate message 37 may specify one or more of the criteria compared by the server 2 to determine said candidate counterparty. For example, the candidate message 37 may be used by the resource 3 to display to a user that a first candidate resource is willing to share the requested amount of energy but is more than a predetermined distance away while a further candidate resource is closer but may not be able to completely satisfy the request for energy. The user of the resource 3 can then select which energy sharing resource they wish to conduct the energy resource transfer.

The candidate message 37 may contain information which provides the resource 3 with the approximate location of each candidate in the list. A more precise location may be provided after the user has selected a candidate counterparty and that selected counterparty has accepted the energy resource transfer request. This provides a degree of privacy for energy sharing resources 4 as their precise location is only revealed after they give permission, which will be explained further below.

The server 2 is configured to receive a selection message 38 from the resource 3 in response to the candidate message 37. The selection message 38 comprises an identifier of one of the candidate energy resources selected by the user of resource 3. In other embodiments, the energy resource wanting to share energy may receive details of candidate counterparties that require energy and subsequently transmit a selection message in a similar manner.

The server 2 may be optionally configured to transmit an energy transfer connection notification message 39 to the energy sharing resource 4. The energy transfer connection notification message 39 informs the user of energy resource 4 (the counterparty willing to share energy) that a counterparty requiring energy has been identified and requests their approval to proceed. This step may be advantageous in terms of security and privacy as the energy sharing resource is notified and must approve the transmittal of their location and possibly identity (such as a photograph) to the resource requesting energy. It will be appreciated that in other examples, once the energy availability message 35 has been sent, there may be no further communication to the user of the energy sharing resource 4 from the server 2.

The server is configured to receive a connection response message 40 from the second energy resource 4 indicative of an acceptance or rejection of the proposed energy resource transfer with the energy requester 3. If the message 40 comprises a rejection of the transfer, the server 2 may proceed to determine an alternative energy resource or may inform the user requesting energy that an energy resource transfer is not possible. However, if the message 40 comprises an approval of the energy resource transfer then the server 2 may be configured to transmit a counterparty identification message 41 to the energy resource 3 requiring energy, which includes location information (or more precise location information if approximate position information was provided previously as described above) of the energy sharing resource 4.

Using the counterparty identification message 41 the energy resource 2 wanting energy is directed to the energy resource 4 willing to provide energy. Accordingly, an energy resource transfer can be performed. It will be appreciated that in other embodiments, an energy resource with energy availability may be directed to the energy resource 2 wanting energy. Accordingly the energy transfer connection notification message 39 and connection response message 40 may be transmitted to/received from the energy requiring resource 2.

The energy resource transfer may be effected in several different ways depending on the types of energy resource exchanging energy. For example, as shown in FIG. 2, the energy generation device 4b of the party willing to share energy is connected to the mobile telecommunication device 3a of the party requesting energy. Alternatively, if the energy resources and, in particular, the energy generation devices are of the same type, such as fuel cell chargers 4a, 4b, then the fuel storage vessel 9 of one party may be connected to the fuel cell 6 of the other party. Accordingly, the energy transfer is effected by sharing the fuel of the fuel storage vessel. Further, the energy resource transfer may be achieved by the sharing party passing the energy resource 4 to connect to the mobile telecommunication device 3a without a further connection to the mobile telecommunication device 4a.

However the energy resource transfer is effected, the server 2 may control and/or monitor and/or receive details of the energy transferred.

If the server 2 is configured to control the energy transfer, it may be configured to receive messages 42, 43 from one or both of the energy resources informing it of an energy transfer suitable connection, such as a wired connection, being made between the resources. The server 2 may then transmit an energy transfer initiation message 44, 45 to one or both parties to begin the transfer. The server 2 may be configured to receive energy transfer progress messages 46, which may be received periodically, allowing it to monitor the progress of the energy transfer. When the server determines from the energy transfer progress messages that the party requiring energy has received the energy they requested from the sharing party, or the sharing party has transferred the offered amount of energy, the server 2 may be configured to transmit an energy transfer termination message 47 to end the energy transfer. Alternatively, control of the energy transfer may be performed by one or both of the mobile telecommunication devices 3a, 4a and/or one or both of the energy generation/storage devices 3b, 4b.

On completion or termination of the energy resource transfer, irrespective of how said transfer was controlled, the first energy resource 3 and/or the second energy resource 4 may send an energy transferred message 48 indicative of the amount of energy that was transferred between the counterparties.

The server 2 may be configured to store the energy transferred against a user identifier or energy resource identifier. This may be used to control or identify counterparties for future energy transfers. Further, a user associated with the energy resource 4 that shared the energy may be rewarded for doing so. The user associated with the energy resource 3 that received the energy may be charged for doing so. Further, the server may be configured to record the number of energy availability messages 35 received from each party or the duration of time each party was willing to share their energy. The server 2 may be configured to issue rewards based on such records.

The location of the mobile telecommunication devices 3a, 4a and/or energy generation/storage devices 3b, 4b involved in an energy resource transfer may be tracked or monitored during said energy resource transfer. Thus, the server 2 may be configured to receive geographical location messages from the mobile telecommunication device 4a of the party sharing energy (which is not directly involved in the energy resource transfer) and geographical location messages from the mobile telecommunication device 3a (or from energy generation/storage device 4b that is connected thereto directly or via the mobile telecommunication device). The geographic location messages may form part of the energy transfer progress messages 46 or may comprise a separate message. The server 2 may be configured to use the location messages to determine a separation distance between the mobile telecommunication device 4a of the sharing party and the energy generation/storage device 4b (connected to mobile telecommunication device 3a) of the sharing party while in use by the energy requiring party. If the distance increases beyond a threshold amount the server 2 may be configured to send a warning message to the mobile telecommunication device 4b to alert the sharing party and/or energy receiving party that their energy generation/storage device is more than a threshold distance away. The server 2 may be configured to halt or control the transfer based on the distance of separation. The geographical location of the devices 3a, 4a, 4b may be determined by the devices themselves, using GPS circuitry or the like, and transmitted to the server 2 or may be determined by the server 2. This is advantageous as the sharing party will keep their mobile telecommunication device 4a with them while the energy requiring party uses the energy sharer's energy generation/ storage device 4b. While the energy generation/storage device 4b may or may not be able to send geographical location messages, the mobile telecommunication device 3a to which it is connected during energy resource transfer can report its geographic location to the server 2 and therefore two reference points are available for determining a separation distance. This provides advantageous security during the energy resource transfer.

Once the energy transfer is completed the server 2 may be configured to wait for a resource returned message 49 from the sharing party indicative of them receiving the energy generation/sharing device 4b back from the energy requiring party. The mobile telecommunication device 4a or energy generation/sharing device 4b may be configured to send the resource returned message 49 automatically when they are connected together.

The resource returned message 49 may be used to determine the return of the energy generation/storage device 4b from the energy requesting party at the end of the energy resource transfer to the energy sharing party. The resource returned message 49 may be used instead of or in addition to the location tracking messages discussed above.

On receipt of the resource returned message 49, the server 32 may be configured to transmit an energy resource transfer complete message 50 to the first energy resource 3 and optionally to the second energy resource 4. The resource transfer complete message 50 may reactivate functions of the first mobile telecommunication device 3a or the first energy generation/sharing device 3b. Thus, for security, functions of the mobile telecommunication device 3a and/or first energy generation/sharing device 3b may be restricted (by way of a message from server 2 or by the app on the mobile telecommunication device 3a) from when the energy resource transfer begins until the energy generation/sharing device 3b is safely returned to its owner. Functions that may be restricted include operation of the first energy generation/ sharing device 3b. This may be achieved by the server 2 determining identification information of any energy generation/sharing devices registered as being owned by the energy requesting party and transmitting a disablement message (at the time of the energy resource transfer or later or when the registered devices are next connected or used) to disable the energy resource 3b until the resource 4b returned message 49 is received.

It will be appreciated that in other embodiments, a server 2 is not provided and instead the function of the server is provided for by an interconnected network of energy resources that initiate peer-to-peer connections to one another to discover energy resources nearby. Thus, a counterparty may be determined by the app on the mobile telecommunications device requiring energy.

Turning to the mobile telecommunication devices 3a, 4a, the invention, as mentioned above, may be implemented using an application or "app" on the mobile telecommunication device 3a, 4a. Thus, the app comprises software that is stored in memory of and executed on a processor of the mobile telecommunications device 3a, 4a. The app in this example is configured to provide for the transmission of messages to offer sharing of an associated mobile energy resource and the transmission of messages to determine a party willing to share energy. It will be appreciated that the app may be configured to perform only one of these two functions.

The app, in this example, is configured to be associated with at least one mobile energy resource 3b. The owner of the mobile telecommunication device 3a with the app installed thereon may also own a mobile energy resource 3b (likewise for the mobile telecommunications device 4a and energy resource 4b). The app is configured to establish a first communication channel for coupling to the energy resource. Thus, the app may be configured to interrogate or receive messages from the energy resource to identify it with a unique ID, identify the type of resource (e.g. fuel cell charger, secondary battery, etc) and/or determine the fuel or energy level of the resource. The app is also configured to establish a second communication channel for coupling to the remote server 2. The app thus provides instructions for the processor of the mobile telecommunications device 3a, 4a such that the processor is configured to receive a status message from the energy resource via the first communication channel. The status message may comprise, in the example where the resource is a fuel cell charger, a fuel level. The app also includes instructions for the processor to provide for the transmission of the energy availability message 35 and a geographic location indicator to the remote server 2 via the second communication channel, the processor further configured to receive an energy request message from the remote server, and to provide for display of said energy request.

Thus, the app may be configured to use geographical location determination circuitry or software of the mobile telecommunication device 3a to determine its geographical location. Alternatively, the geographic location indicator may comprise data that enables the server 2 to determine the geographical location of the device 3a. For example, a network identifier or network routing information may form part of the messages that can be used by the server 2 to determine the geographical location, possibly with reference to a location database.

The user of the mobile telecommunications device may interact with the app via a graphical user interface to specify they are willing to share energy from their energy resource. Thus, the user may actuate a user interface element to state they are willing to share energy. Alternatively, the app may present the user with options to specify conditions of the energy availability. The conditions may comprise the length of time the user is going to be at the present geographical location, the amount of energy they are willing to share, the type of user they are willing to share energy with (e.g. male, female) or any other conditions. Conditions relating to the technical specification of the resource may be determined by the app. The conditions may be used by the server, as mentioned above, as criteria on which to identify counterparties to the energy resource transfer. The energy availability message 35 thus contain the fuel level from the status message and/or any conditions specified by the user.

The app may then be configured to await a response from the server 2, which may comprise the energy transfer connection notification message 39. The app may be configured to display a notification to the user informing them that a party requiring energy has been found. A user selectable option may be displayed for the user to accept or reject the proposed energy resource transfer. The app may be configured to provide for the transmission of the connection response message 40 informing the server 2 of the user selection.

Preparation for the energy resource transfer may comprise the party requiring energy connecting their mobile telecommunications device 3a to the energy resource 4b of the energy sharing party. In this instance, an equivalent app on the device 3a may establish a communication channel to the resource 4b and interrogate and/or receive a status message. The status message may comprise identification information of the resource 4b. The app on the mobile telecommunication device 3a that requires energy may provide for the transmission of the energy transfer suitable connection message 42. The message 42 may inform the server that an energy transfer connection suitable for charging the primary battery of the mobile telecommunication device has been made between the resource 4b and the mobile telecommunication device 3a.

In some examples, the mobile telecommunication device 4a of the energy sharing party, maintains a wired or wireless connection to its associated resource 4b while it is charging the mobile telecommunication device 3a of the other party. This connection may be used to control the energy transfer and/or receive updates about the energy transfer. Further the connection may be used for security such that maintenance of connection is required for the energy transfer to proceed. This may prevent the resource of the energy sharing party straying too far apart from the mobile telecommunications device of the sharing party, due to the wired connection or range of the wireless connection.

The app on the mobile telecommunication device 3a requiring energy and/or the app on the mobile telecommunication device associated with the energy sharing resource 4b may provide for the transmission of messages to the server 21 informing the server of the energy transferred at least when the energy resource transfer is complete. Messages may also be exchanged between app on the energy receiving mobile telecommunication device 3a and the server 2 or the mobile telecommunication device 4a associated with the energy sharing resource 4b to control the energy resource transfer. Alternatively, the app on the mobile telecommunication device 3a of the party requiring energy may control the energy resource transfer based on the amount of energy desired or the amount of energy the energy sharing party was willing to share.

Turning now to the action of the app on the mobile telecommunications device of the energy requesting party 3a, the app provides a graphical user interface to receive input from a user specifying they are in need of energy, possibly because their energy resource has run out of fuel. Thus, the user may simply actuate a user interface element to state they require energy from a remote energy resource. The app may also present options to the user to specify conditions of the energy resource transfer. For example, the conditions may comprise the amount of energy they require, or the time they are available for the energy resource transfer.

The app may be configured to provide for the transmission of the energy request message 36 to inform the server 2 of the desire for an energy resource transfer and any associated conditions.

The app may include instructions to receive the counterparty identification message 41 or any of the intermediate messages discussed in relation to FIG. 3. In response to the candidate message 37 the app may be configured to display a selection interface, which may comprise a map with the candidate counterparties marked thereon in their respective geographic locations or a list of the candidate counterparties. A user actuable selection element may be displayed to allow a user to make a selection, which may comprise a graphic on a touch sensitive display or the designation of a physical button. The app may be configured to provide for the sending of the selection message 38 to inform the user of the selection of a counterparty.

On receipt of the counterparty identification message 41, the app may be configured to direct the user towards the counterparty willing to share energy. A map or a series of instructions or both may be provided by the app (stored locally or remotely, such as via a web based map service). The energy transfer may proceed as described above.

In a further example the server may be configured to determine counterparties to an energy resource transfer based on energy bid messages. The energy bid messages may be received from energy resources that require energy. The bid messages may specify an amount, which may be monetary, the user is willing to pay for energy from another energy resource. The server may determine counterparties based on the energy bid messages and, optionally, geographic location of the counterparties.

The server may be configured to receive an energy value message from the remote energy resources specifying a value of the energy an energy resource is willing to share. Thus, each energy resource may specify the price for which they are willing to share energy. The server may be configured to provide for the determination of the counterparties based on the energy value messages and the energy bid messages. Thus, the energy bid messages may comprise a maximum price a user wanting energy is willing to pay.

The energy bid messages may be used by the server to conduct an auction of energy resources willing to share energy. This is advantageous as the users requiring energy may make one or more bids for energy supplied by users willing to share energy.

The users willing to share energy may set a reserve value by way of the energy value message or a fixed price they want for their energy.

The server may be configured to identify participants for the auction based on criteria specified in auction participation messages received from remote energy resources. The auction participation messages may specify the time a resource is available, the geographic location where they are willing to provide energy, the amount of energy available among other criteria. The server may then be configured to receive the energy bid messages following the receipt of energy availability messages received from other remote energy resources. The server may be configured to determine the counterparties to an energy resource transfer based on the outcome of the auction.

The server may be configured to receive auction specification messages from energy resources specifying one or more of a geographic location where they are willing to be entered into an auction for the energy in their energy resource, a time of day availability, whether they are prepared to come to the user requesting the energy or would the user requesting the energy need to go to them.

The server may be configured to transmit or record a transaction record message which may specify the collection of a transaction fee for brokering the energy resource transfer and/or the collection of payment between counterparties for the energy transferred. Thus, the transaction record message may be sent to a further server (not shown) for collecting or requesting payment.

The server may be configured to determine counterparties based on one or more of willingness to share energy at particular times, willingness to come to the person in need of energy, a measure of the reliability of the energy resource or a credit score of the energy sharer and/or the energy requester.

It will be appreciated that the mobile telecommunication device may include a keypad for receiving user input or a touch sensitive display. The mobile telecommunication device may also include a display. While an app or computer program is described above containing instructions for a processor of the mobile telecommunication device, the above operation may be achieved by hardware or firmware in the device. Further, the computer program that forms the app may be stored on the energy resource or executed by the energy resource. In other embodiments, the energy resource may comprise a mobile telecommunications device that has a fuel cell as its primary source of power. In this embodiment, the energy resource transfer may comprise the sharing of fuel vessels for the fuel cell. The server may be a central server, a distributed server or the function server may be provided over devices of a peer to peer (or Internet of Things) network.

In other examples, some functions, such as identifying energy resources nearby, may be performed via peer-to-peer communication while other functions, such as making a record of the energy transfer transaction, may be performed by peer-server/server-peer communications. For example, an energy resource may be configured to search for other energy resources by direct peer to peer or local messages (such as via ZigBee or Wifi). Thus, the function of the server for the transmission or receipt of energy request messages or energy availability messages is distributed across the energy resources. An energy resource may be configured to transmit a counterparty found message to a server stating that it needs energy and it has identified an energy resource nearby which has enough energy available. The server may then facilitate the energy resource transfer by disclosure of geographical locations and/or the sending and receiving of transfer agreement messages and/or send instruction messages to the counterparties to effect the energy transfer. For example, the counterparties may be prompted to swap their fuel storage vessels by way of the instruction messages.

A user participating in this energy resource system can be rewarded for sharing their energy resource and/or being available for energy sharing. A user having a portable energy resource may be enrolled in an incentive pool and a reward pool. The incentive pool may comprise a lottery-based system to reward users who enroll their energy resource for sharing. The server 2 or further computing device in communication with the server 2 may maintain a record of energy resources and users who are available for energy sharing. The server 2 may also provide details of the energy transferred from a user's energy resource or the number of times they have been involved in an energy resource transfer for assigning a number of reward points to said user. For instance, a user may be rewarded with 10 points every time he shares his charger with another user and additional 10 points for every 30 minutes the charger is being used to charge another user's mobile telecommunication device. The lottery-based system may be based on random selection, but it may be skewed to favour users with more reward points. The greater the reward points, the higher the chances of winning the lottery. A user may also get reward points every time he refills his fuel cartridge 7, 9 or buys a new charger 6, 8 or fuel cartridge 7, 9.

In a further example, a monetary exchange between the counterparties may be facilitated using data from the server 2. Depending on the amount of fuel shared, a user may receive money transferred into his account from the party receiving energy. This may be facilitated electronically using data from the server 2 relating to the energy transferred. To control misuse and unfair pricing, the transaction can be controlled from a central server which can determine the right price for the fuel exchanged. A billing engine, which may be hosted by the further computing device can manage all such transactions and also manage reward points for the user. The billing engine may keep a track of the number of transactions, reward points earned, money earned, etc.

The server 2 or a further computing device may collate the geographical location information received from the parties requesting energy. An analysis engine may be configured to identify patterns in user behaviour, geographical locations that energy resource transfers occur, energy/fuel usage, monetary transactions, etc. The analysis engine may be configured to generate reports to determine potential locations for more energy supply, such as outlets selling fuel cell cartridges or storage vessels or refuelling stations.

The invention claimed is:

1. An energy resource management server comprising:
   means for receiving energy availability messages from remote energy resources and geographic location indicators indicative of the geographical location of said remote energy resources;
   means for receiving energy request messages from remote energy resources and geographic location indicators indicative of the geographical location of said remote energy resources;
   a processor configured to determine counterparties in an energy resource transfer based on received energy availability messages and received energy request messages and the geographical location of the remote energy resources and one or more of:
   i. a transfer time comprising an amount of time at least one of the remote energy resource is willing to engage in said energy resource transfer,
   ii. energy availability time window comprising a temporal window of time at least one of the remote energy resources is available for sharing, and
   iii. a measure of the time required to transfer a particular amount of energy between remote energy resources,
   wherein the processor is configured to transmit, to one or both of the counterparties, geographical location information of the other counterparty of the determined counterparties.

2. The energy resource management server of claim 1 in which the processor is configured to, prior to the transmittal of location information of a first of the counterparties to a second of the counterparties, transmit an energy transfer connection notification message to inform the first counterparty of the identification of a counterparty requesting the energy resource.

3. The energy resource management server of claim 2 in which the processor is configured to await the receipt of a response from the counterparty sent the energy transfer connection notification message before transmitting the location information to the other counterparty.

4. The energy resource management server of claim 1 in which the processor is configured to transmit a list of candidate counterparties having energy availability to the counterparty requesting energy resource, each candidate in the list associated with an approximate location indicator and, after receipt of a selection message which indicates a selected candidate from the list of candidate counterparties, transmit a more precise location indicator for the selected candidate counterparty.

5. The energy resource management server of claim 1 including means to receive energy transfer messages indicative of the amount of energy transferred between the counterparties.

6. The energy resource management server of claim 1 in which the processor is configured to transmit at least one energy transfer control messages to one or both of the counterparties to control the transfer of energy between the counterparties.

7. The energy resource management server of claim 5 in which the processor is configured to associate a record of the amount of energy transferred with a counterparty identifier which identifies at least one of the counterparties.

8. An energy resource management server including
means for receiving energy availability messages from remote energy resources and geographic location indicators indicative of the geographical location of said remote energy resources;
means for receiving energy request messages from remote energy resources and geographic location indicators indicative of the geographical location of said remote energy resources;
a processor configured to determine counterparties in an energy resource transfer based on received energy availability messages and received energy request messages and the geographical location of the remote energy resources, the processor further configured to transmit, to one or both of the counterparties, geographical location information of the other counterparty of the determined counterparties;
means to receive geographical location indicator messages comprising the geographical location of a remote energy resource supplying energy in an energy resource transfer; and
means to receive energy resource owner location messages comprising the geographical location of an owner of an energy resource that is supplying energy in the energy resource transfer, and
a processor configured to provide for determination of the geographical distance, during the energy resource transfer, between the remote energy resource supplying energy to one of the counterparties and the other counterparty comprising the owner of said remote energy resource.

9. The energy resource management server of claim 1 in which the remote energy resources include portable fuel cell power sources having associated fuel reservoirs.

10. A mobile telecommunication device comprising:
a first communication channel configured for coupling to an energy resource;
a second communication channel configured for coupling to a remote server;
a processor configured to receive a status message from the energy resource via the first communication channel and to transmit an energy availability message and a geographic location indicator to the remote server via the second communication channel, the processor further configured to receive an energy request message from the remote server, and to provide for display of said energy request and one or more of:
i) send a message defining a transfer time comprising an amount of time a user of the device is willing to engage in said energy resource transfer, and
ii) send a message defining an energy availability time window comprising a temporal window of time the user of the device is available for sharing.

11. The mobile telecommunication device of claim 10 in which the status message includes an indication of one or more of: an energy resource type; an energy resource level.

12. The mobile telecommunication device of claim 10 in which the energy availability message includes an indication of one or more of: an energy resource type; an energy resource level; an energy availability quantum; a transfer time; an energy availability time window.

13. A mobile telecommunication device comprising:
a first communication channel configured for coupling to an energy resource;
a second communication channel configured for coupling to a remote server;
a processor configured to receive a status message from the energy resource via the first communication channel and to transmit an energy availability message and a geographic location indicator to the remote server via the second communication channel, the processor further configured to receive an energy request message from the remote server, and to provide for display of said energy request; and,
a user interface configured to receive a user input defining an energy availability quantum and an energy availability time window.

14. The mobile telecommunication device of claim 10 further including an energy resource unit, the energy resource unit comprising: a fuel cell power source and a fuel canister; or a fuel reservoir.

15. The mobile telecommunication device of claim 10 wherein the processor is configured to display guidance to the geographical location of at least one of the energy resources willing to share energy.

16. The mobile telecommunication device of claim 10, wherein the processor is configured to control the energy resource transfer based on at least one of the amount of energy specified in the energy request message, an amount of energy specified in a message received from the remote server, at least one control signal received from the remote server or at least one control signal received from another mobile telecommunications device.

17. A non-transient computer program product comprising instructions for execution by a processor to:
receive energy availability messages from remote energy resources and geographic location indicators indicative of the geographical location of said remote energy resources;
receive energy request messages from remote energy resources and geographic location indicators indicative of the geographical location of said remote energy resources;

determine counterparties in an energy resource transfer based on received energy availability messages and received energy request messages and the geographical location of the remote energy resources and one or more of:
i) a transfer time comprising an amount of time at least one of the remote energy resource is willing to engage in said energy resource transfer,
ii) energy availability time window comprising a temporal window of time at least one of the remote energy resources is available for sharing,
iii) a measure of time required to transfer a particular amount of energy between remote energy resources; and transmit, to one or both of the counterparties, geographical location information of the other counterparty of the determined counterparties.

18. A non-transient computer program product comprising instructions for execution by a processor to;
establish a first communication channel for coupling to an energy resource;
establish a second communication channel for coupling to a remote server;
receive a status message from the energy resource via the first communication channel and to provide for the transmission of an energy availability message and a geographic location indicator to the remote server via the second communication channel, and to receive an energy request message from the remote server, and to provide for display of said energy request and one or more of:
i) send a message defining a transfer time comprising an amount of time a user of the device is willing to engage in said energy resource transfer, and
ii) send a message defining an energy availability time window comprising a temporal window of time the user of the device is available for sharing.

* * * * *